April 4, 1967 W. L. MOHAN, JR 3,312,888
CYCLICALLY OPERABLE MEANS FOR MOTOR SPEED CONTROL
Filed Aug. 13, 1962 5 Sheets-Sheet 1

INVENTOR.
William L. Mohan Jr.

INVENTOR.
William L. Mohan Jr.

United States Patent Office 3,312,888
Patented Apr. 4, 1967

3,312,888
CYCLICALLY OPERABLE MEANS FOR
MOTOR SPEED CONTROL
William L. Mohan, Jr., Prospect Heights, Ill., assignor to
Spartanics, Ltd., Sparta, Wis., a corporation of Wisconsin
Filed Aug. 13, 1962, Ser. No. 216,627
15 Claims. (Cl. 318—330)

My invention relates generally to apparatus for obtaining a selectively variable amplitude, variable polarity energy output from an A.C. or D.C. energy source.

Many devices and methods are known in the prior art for converting alternating current electrical energy to direct current electrical energy. One of many such prior art devices is disclosed in my United States Patent No. 2,986,687.

Other prior art devices in use include, for example, motor-generator sets, vacuum and gas tube rectifiers and solid state rectifiers. These devices, and particularly the solid state devices, have provided highly satisfactory results where the use requires a relatively fixed D.C. energy output. However, when substantial variations in D.C. output energy are required, the prior art conversion devices have proven relatively expensive and complex. This tendency toward complex, expensive construction has nowhere been more evident than in the variable D.C. output devices in which polarity is reversible. Also, and perhaps because of their complexity, these prior art variable output, variable polarity devices have proven to be somewhat less reliable than desired.

Another objectionable feature encountered in most of the prior art devices is a non-linear output in response to a linear change in their input control signal.

Still other prior art devices have been used when it is desired to convert fixed amplitude, fixed phase A.C. energy to variable amplitude, reversible phase A.C. energy. Among the prior art devices in this class are include A.C. amplifiers of many tpes including both voltage and current amplifiers in considerable variety. These amplifiers have utilized vacuum tubes, transistors and magnetic devices in many combinations. However, as with the A.C. input, D.C. variable amplitude output devices, the variable phase and amplitude A.C. output devices have been quite complex and expensive whenever substantial variations in output energy are required.

Accordingly, it is a special object of my invention to provide new and improved apparatus for converting fixed amplitude, fixed phase A.C. electrical energy to variable amplitude, reversible phase electrical energy.

Another and a general object of my invention is to provide a new and improved apparatus for converting A.C. electrical energy into D.C. electrical energy.

It is a particular object of my invention to provide new and improved apparatus for converting A.C. electrical energy to variable output D.C. electrical energy.

Yet another object of my invention is to provide new and improved apparatus for converting A.C. electrical energy into variable output, variable polarity D.C. electrical energy.

A special object of my invention is to provide a new and improved full wave rectifying apparatus with a variable D.C. voltage output of variable polarity and which is adapted for use with single or polyphase A.C. voltage sources.

It is a further object of my invention to provide new and improved rectifying apparatus having a variable D.C. voltage output of variable polarity in which the output voltage and polarity may be varied in a substantially linear manner by a linear change in a control signal.

It is a still further object of my invention to provide new and improved rectifying apparatus as described above which finds advantageous use in the control of the speed of D.C. and single phase series A.C. motors.

An important object of my invention is to provide new and improved rectifying apparatus with a variable D.C. voltage output of variable polarity which is characterized by its simple and economical construction, its flexibility and adaptability to various applications and which yet achieves a reliability in operation not heretofore believed possible.

Still another important object of my invention is to provide new and improved apparatus for converting fixed amplitude A.C. electrical energy into variable amplitude A.C. electrical energy.

Still another object of my nvention is to provide new and improved apparatus for converting fixed polarity D.C. energy into variable amplitude, variable phase A.C. electrical energy.

These and other objects and features of the invention are realized in the embodiments of this invention by circuitry employing polar relays. Polar relays are relays having at least one pair of contacts employed in a double throw arrangement. These contacts are alternately closed in response to the polarity reversals of an A.C. input on their coil. Neither of the contacts in the double throw arrangement is closed when the relay coil is deenergized. In addition to these features, polar relays are generally very reliable devices and this reliability is further enchanced in the preferred practice of the invention by the use of relays employing mercury wetted contacts. Relays so constructed have extremely long service life. Typically, the life expectancy of relays so constructed is several billions of cycles of contact closures before failure.

In the simplest of the inventive embodiments, a single polar relay is used to control the amplitude of a half-wave rectified A.C. source. In this embodiment, the polar relay coil is energized or pumped by a fixed phase (low frequency) A.C. source. Because of the electrical characteristics of the relay's coil and the mechanical inertia of its contact system, contact closure occurs substantially after the phase reversal of the A.C. pumping sources. Typically, contact closure is about 135° after phase reversal.

The relay's coil connection is completed to ground through a control circuit which contains provisions for selectively varying the amplitude of a voltage substantially phase displaced with respect to the phase of the A.C. pumping source. With no command signal, the control circuit acts as a low impedance connection to ground with the result that the relay's armature oscillates between its two contacts, maintaining each closed for substantially ½ cycle of the A.C. pumping source. As the command signal at the input of the control circuit increases in amplitude, the time domains during which each relay contact is closed is shifted relative to the phase of the A.C. pumping source. Since the controlled load is series connected between ground and the A.C. pumping source through the relay's armature, a relay contact and a diode, the shift in contact phasing causes the diode rectified half-wave output through the load to be varied in its average amplitude following the control signal either directly or inversely depending on circuit connections.

As will be apparent from the detailed description, an important feature of the inventive apparatus is a provision for controlling its variable output level, whether A.C. or D.C., by means of feedback signals compared to the command signals. The comparison or error signal is utilized to control the amplitude of the control signal applied to the coils of the polar relays in response to any variation in output level. Alternately, if the load is a motor, variations in motor speed can be used to generate error signals. Similarly, if the load is radiation, depending only on ability to obtain a sensor sensitive to that radiation, radiation intensity may also be controlled.

Still another feature of the invention is its adaptability to both single and polyphase A.C. voltage sources and its ability to provide controlled amplitude A.C. or D.C. outputs for each of these sources.

Another important feature of the invention is the achievement of a variable amplitude, reversible polarity D.C. output from an A.C. input without the use of conventional rectifiers. These and other features of novelty of the invention are emphasized and explained in the specifications and in the claims annexed hereto. For a better understanding of the invention, reference is made to the accompanying drawing and descriptive matter in which are shown several illustrative embodiments of the invention.

Figures 1, 2:
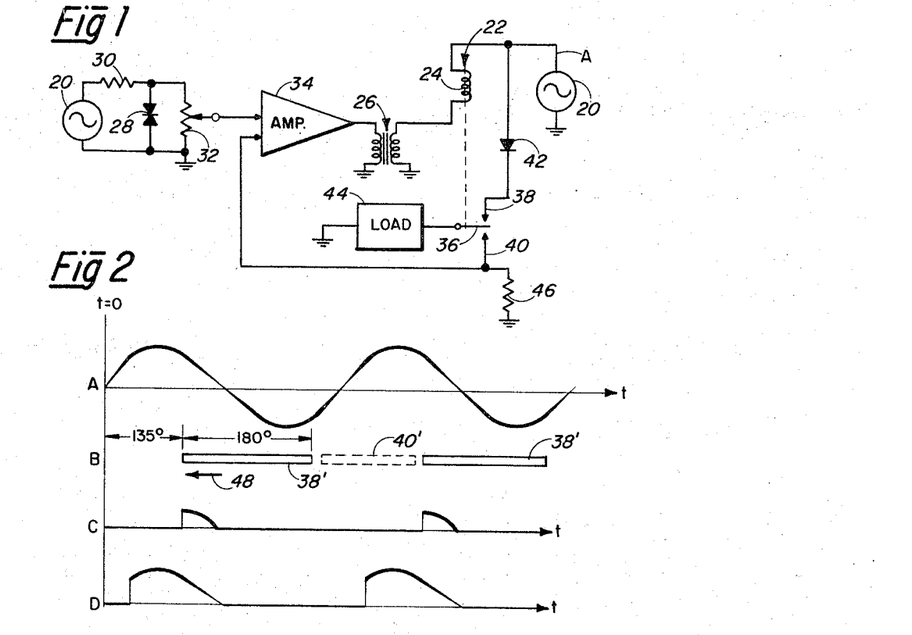
FIGURE 1 is a schematic representation of an illustrative variable output rectifier system embodying the basic principles of the invention.
FIGURE 2 is a chart showing wave forms and time domains of relay contact closure occurring during the operation of the circuit of FIGURE 1.

Referring now to the drawing, FIGURE 1 illustrates schematically the principles of the invention in their simplest aspect as applied to the control of a D.C. load. A single phase A.C. source is connected to the device at the terminals generally indicated as 20. The wave form of the input is graphically illustrated at A in FIGURE 2.

A polar relay 22 having a coil 24 is connected to source 20 and through coupling transformer 26 to a control circuit. As described above, because of the electro-mechanical characteristics of polar relays, contact closure of the relay occurs substantially after phase reversal of the A.C. source 20. Typically, this delay approximates 135° and results in the time domains of relay contact closure illustrated in FIGURE 2B. In that figure, the blocks labeled 38′ and 40′ represent the time domains during which relay contacts 38 and 40 respectively are closed.

In the embodiment of FIGURE 1, the variable amplitude command signal advantageously is a square wave generated by zener diode 28 connected across the A.C. source 20. Resistor 30 functions as a current limiter for the zener diode 28. The amplitude of the square wave command signal is varied by means of potentiometer 32. Connected to potentiometer 32 is a conventional A.C. differential amplifier 34 having its output phase shifted with respect to the voltage across the coil 24 to enable a shift in the time domains of relay contact closure as the command signal is increased in amplitude. It has proved desirable to adjust this phase shift to a minimum of 90°.

The output of amplifier 34 is coupled through transformer 26 to the coil of polar relay 22. While the coupling 26 is illustrated and described as a transformer in this embodiment and in equivalent locations in other embodiments, other low impedance couplings may be used.

The armature 36 of relay 22 oscillates back and forth following the phase reversals of source 20, alternately contacting the relay contacts 38 and 40. Contact 38 is connected to one side of the A.C. source 20 through a diode 42 which provide half-wave rectified D.C. to the load. The D.C. load 44 is connected between the relay armature 36 and ground. Thus, whenever armature 36 makes contact with contact 38, that portion of the voltage wave form of the A.C. line 20 that is passed by diode 42 is applied through the load to ground.

If the D.C. load 44 is a motor, the C.E.M.F. may be advantageously employed as a feedback or speed error signal. As is well known to those versed in the electrical arts, the magnitude of the motor C.E.M.F. is directly proportioned to motor speed. Because the feedback signal appearing at relay contact 40 is achieved by the chopping action of armature 36, it is essentially a square wave. For this reason, the command to amplifier 34 should also be a square wave if good error characteristics are desired. Whenever load 44 is passive or whenever feedback is not employed, the command signal need not be a square wave and the zener diode 28 and resistor 30 utilized to generate the command square wave may be dispensed with. In circuits employing a feedback error signal, resistor 46 is used to discharge any stray capacitance and thus ensure square wave inputs to amplifier 34.

FIGURE 2 illustrates wave forms appearing during operation of the embodiment of FIGURE 1 and the time domains of relay contact closure appertaining thereto. The wave form of the A.C. input is graphically illustrated at A. B illustrates the time domain of armature closure to relay contact 38 and 40 when no command signal is present. As can be seen, contact closure is approximately 135° after $t=0$ and the contacts remain closed for substantially 180° of the input wave train. Illustrated alongside of the time domain blocks at B in FIGURE 2 is arrow 48 which indicates the direction of phase displacement of relay contact closure with increasing amplitude of the command signal. In other words, as the command signal at the output of amplifier 34 increases in amplitude, the time domain of relay contact closure illustrated at B moves proportionately in the direction of arrow 48.

Illustrated at C in FIGURE 2 is the effective D.C. power to the load 44 when the command signal is zero and relay contact closure occurs as indicated at B. FIGURE 2D illustrates the effective D.C. power to the load 44 after a 90° shift in the time domains of the relay's contact closure from the position shown at B.

For the simple system of FIGURE 1, it is possible to obtain an increase in the effective D.C. power output to load 44 by increasing the phase difference between the command signal and the contact closure. While this is possible, it has not proven practical for such simple embodiments as that of FIGURE 1 because such embodiments are generally employed where control requirements are minimal and where cost considerations and reduced complexity are of the essence.

Figure 3:
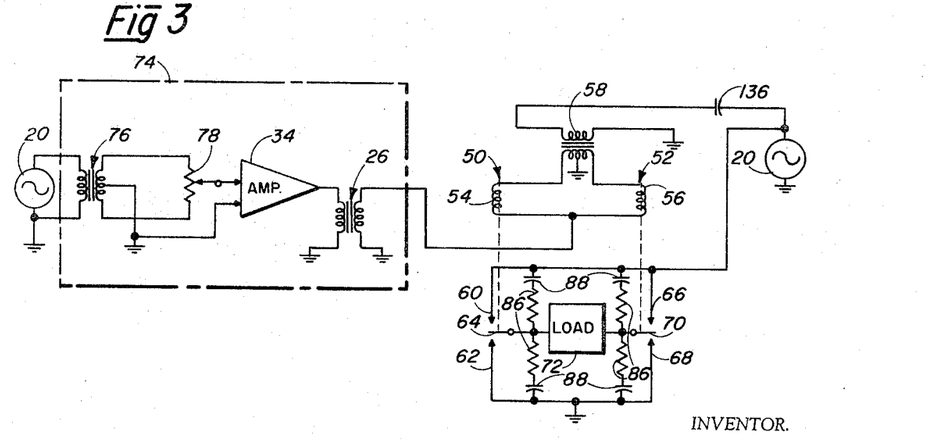
FIGURE 3 is a schematic representation of an illustrative embodiment of the invention which provides a full wave rectified, variable amplitude, reversible polarity D.C. output from a single phase A.C. source.

FIGURE 3 illustrates in schematic form the inventive principles applied to a system having a reversible polarity, variable amplitude, full wave D.C. output from a single phase A.C. source. This embodiment of the invention employs two polars relays 50 and 52 having coils 54 and 56 respectively. Each of the coils is connected to the output of a center tap isolation transformer 58 having its center tap grounded and its primary supplied from single phase A.C. source 20. The remaining coil connection for both polar relays 50 and 52 is completed to ground through a control circuit 74 which contains provisions for selectively varying the amplitude of a command voltage. Advantageously, means such as capacitor 136 are included in the primary circuit of transformer 58 to adjust the time domain of closure of the contacts of the polar relays 50 and 52 relative to the phase of the A.C. pumping source 20.

Figure 4:
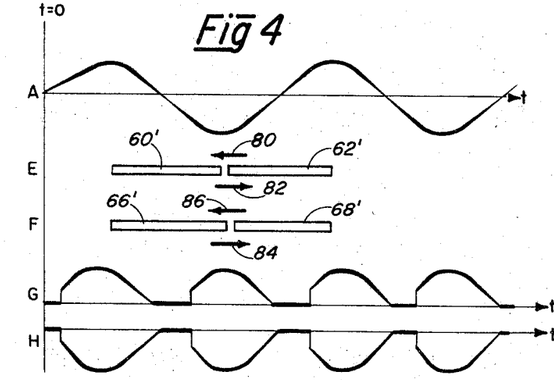
FIGURE 4 is a chart showing wave forms and the time domains of relay contact closures occurring during operation of the embodiment of FIGURE 3.

As illustrated in FIGURE 4E, closure of relay contacts 60 and 62 of relay 50 by armature 64 is advantageously adjusted to occur relative to the input wave train A at 90° and 270° respectively. Similarly, contacts 66 and 68 of relay 52 are closed by armature 70 at 90° and 270° relative to the input A.C. wave train A. The time domains of relay contact closure shown in FIGURE 4E and F is the condition existing when no command signal is applied to the polar relay's coils. This causes contacts 60 and 66 to open and close simultaneously and with the load 72 connected therebetween, the load is always connected to the same side of the A.C. supply line with the result that no power flows through the load.

By varying the time domain of the relay's contact closure relative to the A.C. input wave train A, the load may be supplied with full wave rectified D.C. power of variable amplitude and reversible polarity. This shifting of the time domain of relay contact closure is advantageously adjusted by means of a variable amplitude, reversible phase command signal generated in the control circuit generally indicated at 74.

Control circuit 74 is powered by the same single phase A.C. source 20 used to pump the polar relays. Source 20 is connected to circuit 74 through a center tap isolation transformer 76 having its center tap grounded. The command signal is generated by varying the position of the wiper of a potentiometer 78 connected across the secondary windings of transformer 76.

The output command signal at the wiper of potentiometer 78 is passed to a conventional A.C. amplifier 34. As described above in conjunction with FIGURE 1, the output of A.C. amplifier 34 is phase adjusted relative to the time domain of contact closure of relays 50 and 52. In embodiments constructed to date, it has been found advantageous to maintain the output phase of amplifier 34 at quadrature relative to the pumping voltage from transformer 58. The output command signal from amplifier 34 is connected to relays 50 and 52 through coupling transformer 26. As pointed out above, any suitable low impedance coupler may be used in place of the transformer 26 illustrated.

Figure 5:
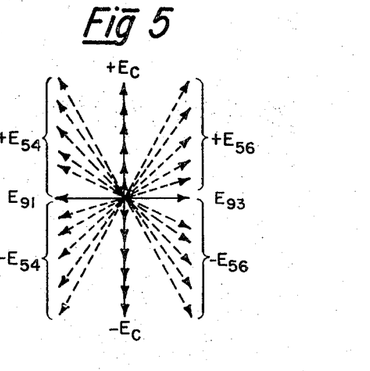
FIGURE 5 is a vector diagram illustrating the shifting phase of the voltage across the coils of the relays of FIGURE 3 as the magnitude and phase of the command signal is varied.

Referring now to FIGURES 4 and 5, which are charts showing the wave forms and vectors illustrating the operation of the circuit of FIGURE 3, arrows 80, 82, 84 and 86 indicate the direction of travel of the time domains of the relay's contact closure relative to the A.C. line under the influence of various command signals, $E_c$. Arrows 80 and 84 illustrate the direction of movement of the time domains of the contacts for a positive command signal, $+E_c$. The amount of movement of the time domains is proportional to the amplitude of the command signal which may be varied by movement of the wiper of potentiometer 78. Arrows 82 and 86 illustrate the direction of movement of the time domains for a negative command signal, $-E_c$.

FIGURE 4G illustrates the condition where the command voltage $E_c$ is at a maximum and positive amplitude. For this condition the output power through the load 72 is positive and at a maximum. FIGURE 4H illustrates the reverse condition where $E_c$ achieves its maximum negative amplitude and the output power through the load 72 is negative and at a maximum.

FIGURE 5 is a vector diagram illustrating the shifting phase of the voltage across relay coils 54 and 56 as a function of the magnitude and phase of the command input, $E_c$. For no command input, the voltages across the two coils are substantially identical and are the same as those across the two halves of center tap isolation transformer 58. The vectors representing the voltages on either side of the center tap transformer 58 are indicated as $E_{91}$ and $E_{93}$. For an increasing amplitude of a positive phase command signal, $+E_c$, the vectors representing the voltages across coils 54 and 56 are indicated within the brackets labeled $+E_{54}$ and $+E_{66}$ respectively. For increasing amplitude of a negative phase command signal, $-E_c$, the vectors are those shown within the brackets $-E_{54}$ and $-E_{56}$. From the foregoing it can be seen that movement of the wiper of potentiometer 78 from its centered position will result in varying amplitude, reversible polarity D.C. power being supplied to the load 72. The series connected resistors 86 and capacitors 88 connected across each of the contacts of the polar relays are provided for arc suppression and are varied depending upon load characteristics.

Figure 6:
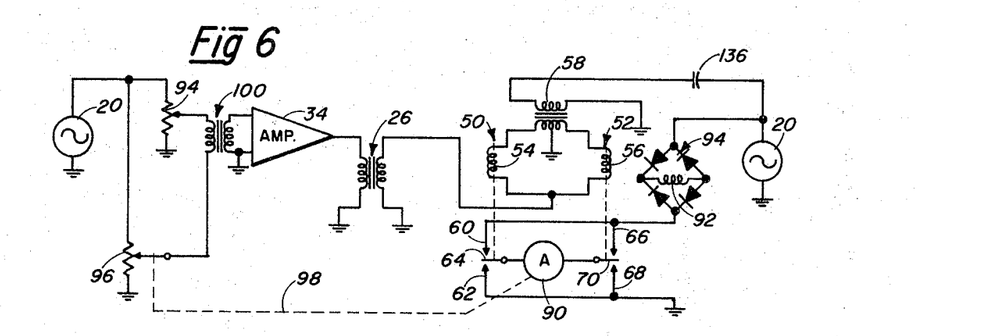
FIGURE 6 is a schematic illustrating the application of the inventive principles to a positional servo system.

FIGURE 6 illustrates the inventive principles applied in positional servo control system. The motor 90 used in this system may be a series motor as indicated or, alternately, a shunt, a compound, a permanent magnet or a universal type motor, as desired and depending on the demands placed on the motor system.

The operation of the embodiment shown in FIGURE 6 is nearly identical to that of the embodiment shown in FIGURE 3 and all like elements have been identified with the same reference numerals. The load 90 connected between the relay armatures 64 and 70 of relays 50 and 52, respectively, advantageously is the armature of a D.C. series motor. The field 92 of the motor is connected across the full wave bridge rectifier generally indicated at 94. The position command to the system is supplied by moving the wiper of potentiometer 94. Both potentiometer 94 and a feedback potentiometer 96 are supplied with an A.C. reference from the single phase source 20. The wipers of both potentiometers are connected to the terminals of the primary of a coupling transformer 50, whose secondary is in turn connected to the input of conventional A.C. amplifier 34. The wiper of feedback potentiometer 96 is mechanically coupled to the armature 90 of the series motor by means of gearing or any other suitable linkage as schematically shown at 98.

Displacement of the wiper of potentiometer 94 results in an error signal at the input of amplifier 34. This error signal results in an output error command signal, $E_c$, which shifts the time domains of the relay contacts in a manner identical to that described above for the embodiment of FIGURE 3. The result of the shifting time domains of the relay contacts is an application of or change in the power supplied to the armature 90 of the motor to effect its movement. The movement of the armature 90 is transmitted by the linkage 98 to the wiper of feedback potentiometer 96 and results in the cancellation of the error signal at the input of couple 100.

Figure 7:
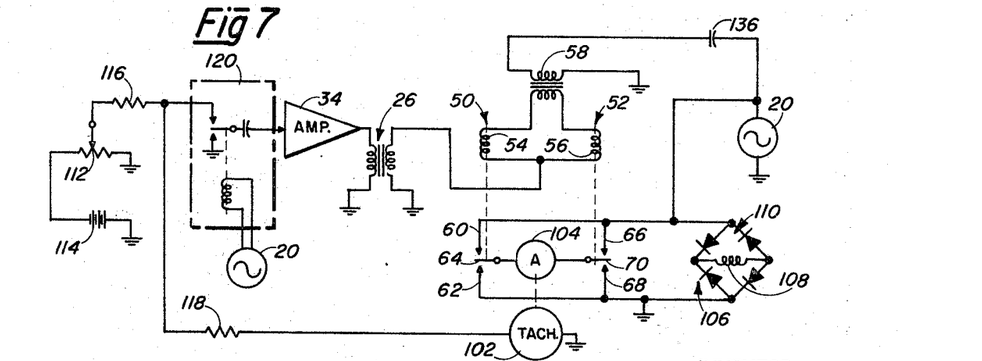
FIGURE 7 schematically depicts a velocity servo system.

FIGURE 7 illustrates in schematic form the application of the inventive principles to a velocity servo system. As with the embodiment of FIGURE 6, the embodiment of FIGURE 7 operates in a manner very similar to the embodiment of FIGURE 3. The major difference between the embodiments of FIGURES 6 and 7 is the manner of generating the feedback signal. In FIGURE 7 the error feedback signal is generated by a D.C. tachometer 102 which is mechanically coupled to the armature 104 of the D.C. shunt motor generally indicated at 106. The armature 104 is connected between the armatures 64 and 70 of the polar relays 50 and 52 respectively, as was the case with the loads in the previously described embodiments. The motor's shunt field 108 is connected across the full wave bridge rectifier generally indicated at 110.

The velocity command signal is generated by positioning the wiper of potentiometer 112. Potentiometer 112 is supplied with a D.C. input from a source generally indicated as battery 114. Both the output of potentiometer 112 and of tachometer 102 are passed through summing resistors 116 and 118 respectively to the input of the modulator generally shown at 120. It will be appreciated by those versed in the electrical arts that modulator 120 need only be used when the source 114 and tachometer 102 provide D.C. outputs. If an A.C. tachometer and an A.C. source of command signals are employed, modulator 120 may be dispensed with. The A.C. output of modulator 120 is applied through amplifier 34 and coupling transformer 26 to the coils 54 and 56 of polar relays 50 and 52. While modulator 120 has been shown as a conventional, mechanically chopping type, since such types have proven to be eminently well suited to low frequency use, other types of modulators can be employed without departing from the spirit of the invention.

Figure 8:
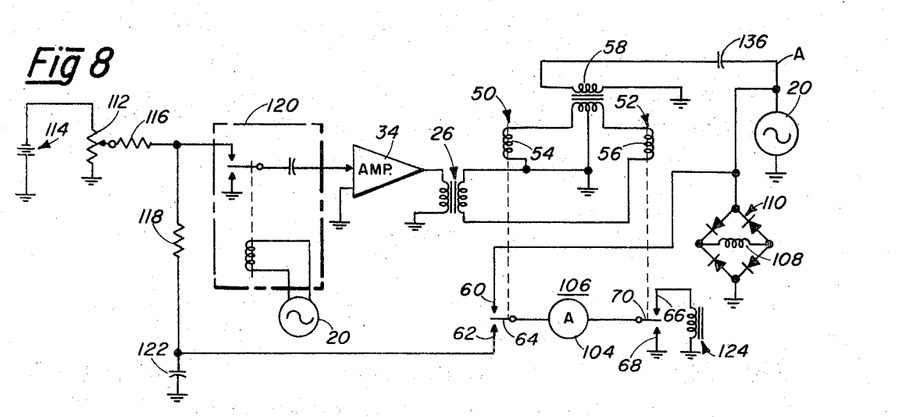
FIGURE 8 is a schematic representation of an illustrative embodiment of the invention employing the counter E.M.F. of a motor load as the feedback signal of a velocity servo system.

FIGURE 8 illustrates in schematic form an inventive embodiment having a half-wave, variable amplitude D.C. output and adapted to the control of a velocity servo. The embodiment of FIGURE 8 operates in a manner nearly identical to that of FIGURE 7. That is, both employ a shunt motor and D.C. feedback. However, as illustrated in FIGURE 8, the D.C. feedback signal is obtained from the counter-E.M.F. of the shunt motor 106 by virtue of a connection to relay contact 62. The feedback through summing resistor 118 is connected to the input of modulator 120 as previously described. A capacitor 122 is provided to store a charge proportional to the motor counter-E.M.F. during the interval that relay contact 62 is closed to the armature 104. Capacitor 122 is chosen so that its time constant, in combination with summing resistor 118, is long compared to the frequency of the A.C. input from source 20. A choke 124 connected between relay contact 66 and ground is chosen to provide both a high impedance path to ground and so that its LC time constant, in combination with capacitor 122, is short compared to the frequency of the A.C. source 20. By thus selecting the values of capacitor 122 and choke 124, capacitor 122 is rapidly charged and slowly discharged, thus minimizing fluctuations in the counter-E.M.F. feedback error signal.

Figure 9:
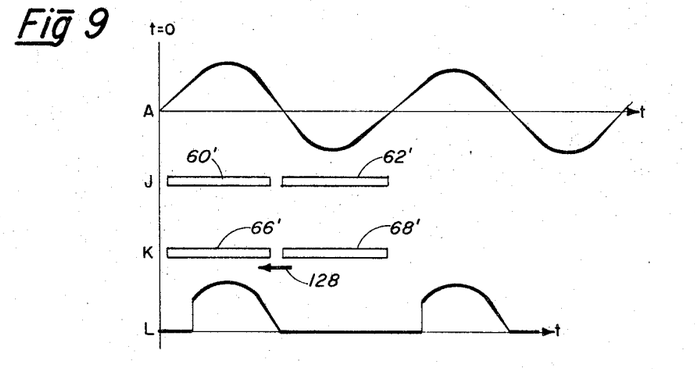
FIGURE 9 is a chart showing wave forms and the time domains of relay contact closures occurring during operation of the embodiment of FIGURE 8.

FIGURE 9 illustrates the time domains of the closures of the relay contacts relative to the input A.C. wave train A of source 20 and also illustrates the power output to the load. For the embodiment of FIGURE 8, capacitor 136 has been chosen to provide time domains of closure of relay contacts 60 and 66 which occur simultaneously with the beginning of the positive excursion of the input wave train A. The time domain of closure of contacts 62 and 68 begin 180° after those of contacts 60 and 66 respectively. As will be apparent from an examination of FIGURE 8, the error command signal affects the operation of relay 52 only and relay 50 is pumped in phase with the A.C. input wave train regardless of the magnitude of the error signal. Thus, for an increasing amplitude of error signal $E_c$, the time domains of closure of relay contacts 66 and 68 are shifted, increasing distances in the direction of arrow 128. If the phase of the command signal $E_c$ is adjusted to be 120° in advance of the input wave train reference, the maximum power output to the load 104 is as shown at L in FIGURE 9. While the phase difference of 120° between the output of amplifier 34 and the input wave train has proven satisfactory in embodiments constructed to date, obviously this phase difference can be increased or decreased, depending on the requirements of the particular velocity servo system.

Figure 10:
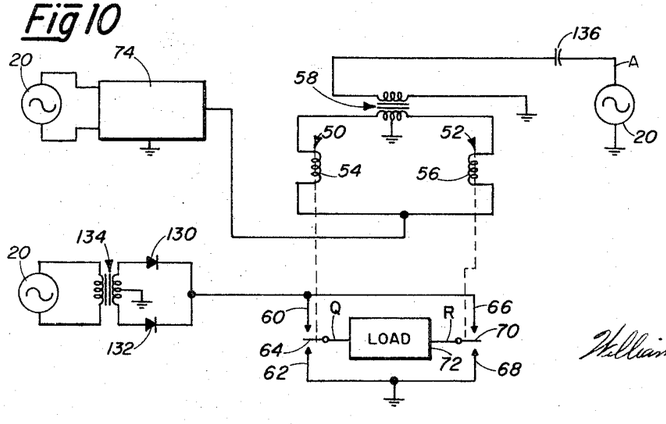
FIGURE 10 is a schematic of an illustrative embodiment of the invention having a variable amplitude, reversible phase A.C. output.

FIGURE 10 shows in schematic form the application of the inventive principles to a reversible phase, variable amplitude A.C. output apparatus. The operation of this apparatus is identical to the operation of the embodiments illustrated in any one of the FIGURES 3, 6 or 7 with the exception that the contacts of relays 50 and 52 are connected across a D.C. source. As shown in FIGURE 10, this unfiltered D.C. source is comprised of a center tap transformer 134 having its primary connected across A.C. source 20 and its secondary connected through diodes 130 and 132 to provide full wave rectified D.C. to the relay contacts. As will be apparent from the description that follows, center tap transformer 134 and its associated circuit could equally well be replaced with any other D.C. source without departing from the spirit of the invention. However, for a smoothed D.C. source, the wave forms of FIGURES 11–14 inclusive will be square waves or those derived from square waves in place of the sine waves shown.

FIGURES 11–14 inclusive illustrate the output wave forms and the time domains of relay contact closures occurring for various amplitudes of command signal, $E_c$, applied to the circuitry of FIGURE 10. The full wave rectified D.C. to the relay contacts is illustrated at M. With capacitor 136 chosen to cause contacts 60 and 66 to close 90° after $t=0$ and with the command signal at quadrature thereto, the time domain and direction of shift of the time domains are as illustrated at E and F in FIGURE 11 and as described above in conjunction with the description of FIGURE 4. For a zero amplitude command signal and hence a zero shift of the time domains of relay contact closure, the voltage measured across both armature 64 and ground and armature 70 and ground is as shown at N in FIGURE 11. Since both voltages are identical, the output through the load 72 is zero.

Figure 12:
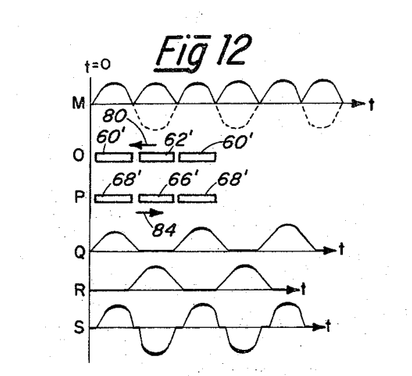

FIGURE 12 illustrates the condition where the command signal $E_c$ is positive and at a maximum, resulting in a phase shift of relay contact time domains to the position illustrated at O and P. For these time domains, the voltage wave form appearing across armature 64 and ground is as illustrated at Q and the voltage wave form appearing across armature 70 and ground is as shown at R. The power through the load is the difference between the wave trains Q and R and is as illustrated at S.

Figure 13:
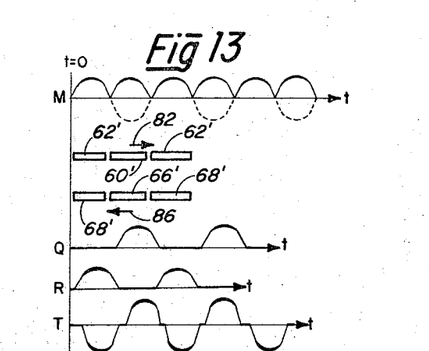

FIGURE 13 is similar to FIGURE 12 but illustrates the condition where the error command signal $E_c$ is negative and at a maximum. As can be seen, the time domains of relay contact closure and of the voltage $E_{64}$ across armature 64 and $E_{70}$ across armature 70 are 180° out of phase with respect to that shown in FIGURE 12. As a result, the output power through the load is also 180° out of phase with respect to the line reference. The wave train for 180° out of phase output power is shown at T.

Figure 11:
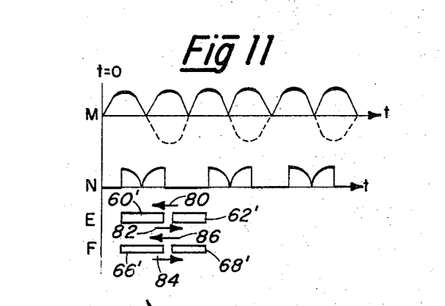
FIGURES 11, 12, 13 and 14 are charts showing wave forms and the time domains of relay contact closure occurring during operation of the apparatus of FIGURE 10.
Figure 14:
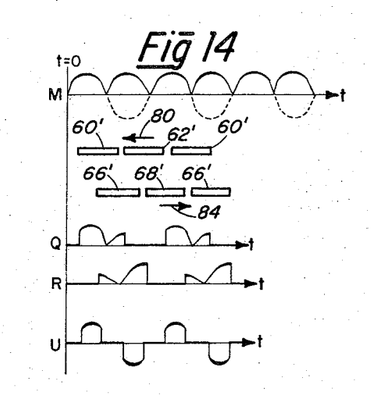

FIGURE 14 represents a condition intermediate to that of FIGURES 11 and 12. That is, the contacts 60 and 66 have been advanced an amount less than the 90° illustrated in FIGURE 12. For this condition the output power to the load is in phase with the line reference and has a voltage wave form as illustrated at U.

Figure 15:
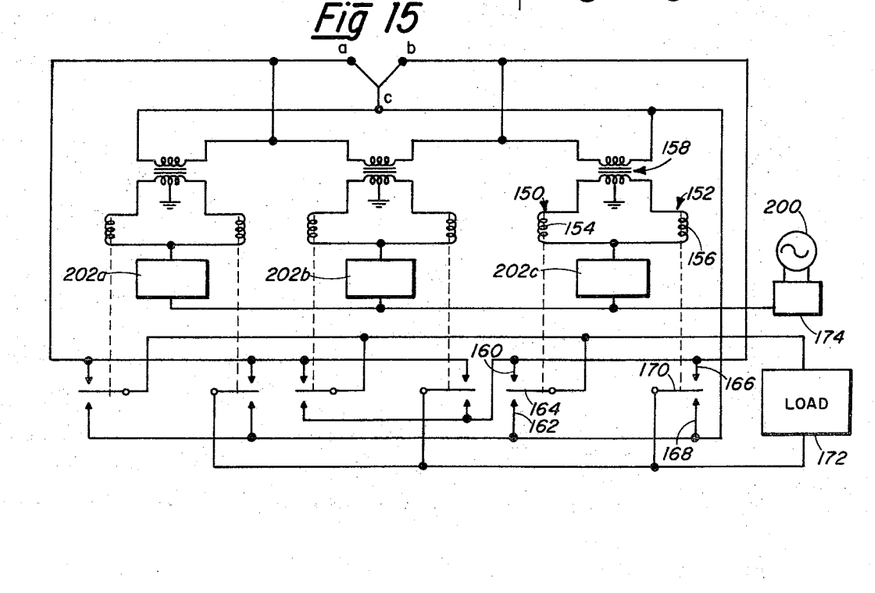
FIGURE 15 is a schematic diagram of an illustrative embodiment of the invention adapted to provide a full wave rectified, variable amplitude, reversible polarity D.C. output from a three phase A.C. source.
Figure 16:
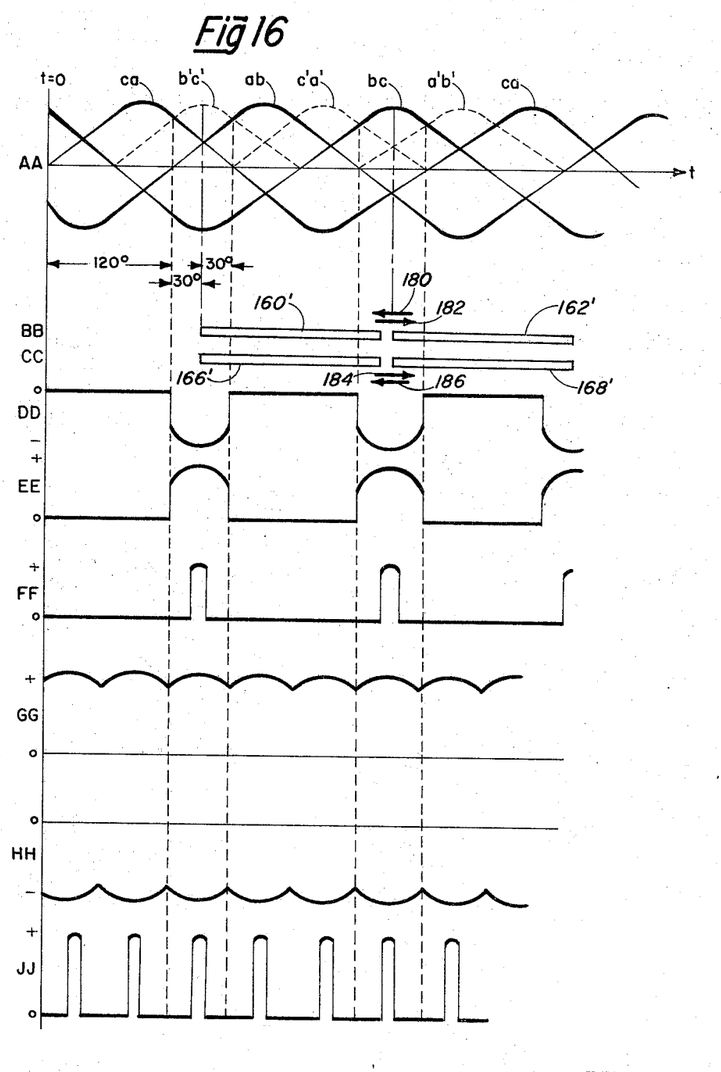
FIGURE 16 is a chart depicting wave forms and time domains of relay contact closures illustrative of the operation of FIGURE 15.

An illustrative system embodying the principles of this invention to provide full wave rectification of a three phase, three wire source is shown schematically in FIGURE 15 wherein the three leads supplying the A.C. power have been designated $a$, $b$ and $c$. The wave forms of the input are graphically illustrated in FIGURE 16 at AA. In FIGURE 16AA the wave labeled $ca$ represents the voltage wave form of phase $c$ with respect to phase $a$ and similarly for waves $ab$ and $bc$.

The three phase apparatus of FIGURE 15 is in essence a multiple of the apparatus of FIGURE 3 with each of the three pairs of polar relays connected as in FIGURE 3 and with the three pairs interconnected as illustrated.

Since the operation of each pair of relays is analogous to the operation of the relay pair of FIGURE 3, the reference numerals used in FIGURES 3 and 4 have been repeated in FIGURES 15 and 16 but with the addition of 100. Thus, control circuit 74 of FIGURE 3 is designated 174 in FIGURE 15 and similarly for other reference numerals.

Since the three line phases each have an inventive system connected thereacross and the operation of each of the inventive systems is identical in all respects but phasing, the operation of only one of the three systems employed in FIGURE 15 and the phasing of its relay contact closures will be described. The system described is that operating in conjunction with phase bc of the three phase source. For a zero error command signal from control circuit 174, the phasing of the relay contacts of relay 150 is as illustrated in FIGURE 16BB and the phasing of the realy contacts of relay 152 is as illustrated in FIGURE 16CC. Control circuit 174 is almost identical to the control circuit 74 described above. However, the output command signal $E_c$ of circuit 174 is limited in its amplitude to an amount which will shift the time domains of relay contact closure a maximum of + or −30°. Control circuit 174 is supplied with single phase power from source 200. It is within the scope of the invention to replace source 200 with a connection to a single phase of the input three phase supply. Phase shifters 202a, 202b and 202c are provided to shift the phase of the command signal $E_c$ so that it will be at quadrature with the phase impressed on each pair of relays. For simplicity in the drawing, means similar to capacitor 136 described above for adjusting the phase of a pair of relays relative to the line phase it is associated with have been omitted but are assumed to be present for each phase.

The maximum positive or negative power from phase bc is shown in FIGURES EE and DD respectively. The maximum positive power from phase bc is achieved when the time domains of relay contact closures are shifted 30° in the direction of arrows 180 and 184 from the neutral position illustrated at BB and CC. The maximum negative power is similarly achieved by a 30° shift of the time domains in the direction of arrows 182 and 186. FIGURE FF illustrates a positive power output from phase bc achieved from a shift of less than 30° in the time domains of relay contact closure.

With all three relay pairs operating in a manner similar to that described above for the relay pair associated with phase bc, the maximum positive output is as shown at GG and is achieved with a 30° shift in the time domains of relay closure of each pair. The maximum negative output to the load 172 is as shown at HH and is achieved by a reverse shifting of the time domains. FIGURE 16JJ illustrates the power output to load 172 resulting from a shift of the time domains of all three relay systems in an amount less than 30°.

Although the embodiments described above have all been described as using polar relays, it will be obvious to those skilled in the electrical arts that any apparatus, mechanical or solid state, capable of being switched from a high ohmic impedance to a low ohmic impedance synchronously may be used in the practice of the invention. Such alternate apparatus might include power diode modulators, power transistor modulators, synchronous communtators and other similar devices. However, while such devices may be used, generally their reliability and their response are materially lower than the polar relays described. For these reasons, the prefered forms of the invention and all embodiments constructed to date have employed polar relays.

Accordingly, modifications may be made in the construction and arrangement of the above described embodiments of the inventive system without departing from the real spirit of the invention, and it is intended to cover by the appended claims any modifications or use of equivalents which may be included within their scope.

What is claimed as the invention is:

1. Apparatus for converting fixed amplitude electrical energy into variable amplitude electrical energy comprising
 a source of fixed amplitude energy,
 cyclically operable switching means,
 a load connected in parallel with said source and in series with said switching means,
 means connected to said source and coupled to said switching means for cyclically actuating said switching means in a fixed phase relationship to cyclic variations in said source, and
 control signal generating means connected to said cyclical actuating means and having a selectively variable amplitude command signal output for varying the phase of actuation of said switching means relative to the cyclic variation in said source in proportion to the amplitude of said command signal,
 whereby the amplitude of the electrical energy through said load is selectively varied.

2. Apparatus for converting fixed amplitude electrical energy into variable amplitude electrical energy comprising
 a source of fixed amplitude energy,
 cyclically operable switching means,
 a load connected in parallel with said source and in series with said switching means,
 means connected to said source and coupled to said switching means for cyclically actuating said switching means in a fixed phase relationship to cyclic variations in said source, and
 control signal generating means having a selectively variable amplitude command signal output, said control signal generating means having its output connected to said cyclical actuating means for varying said fixed phase relationship in proportion to the amplitude of said output command signal,
 whereby the amplitude of the electrical energy through said load is selectively varied.

3. Improved apparatus for controlling the speed of electric motors of the type operable from D.C. energy comprising
 a source of fixed amplitude A.C. energy,
 at least one cyclically operable contact pair means,
 a motor connected in parallel with said source and in series with said contact pair means,
 means connected to said source and coupled to said contact pair means for cyclically actuating said contact pair means in a fixed phase relationship to cyclic variation in said source,
 control signal generating means having a selectively variable command signal output,
 feedback signal generator means responsive to variations in the velocity of said motor to generate signals proportional to the velocity, and
 servo means having its input connected to said control signal generating means and said feedback signal generator means and its output connected to said cyclical actuating means for varying said fixed phase relationship in proportion to any difference between said command signal and said feedback signal,
 whereby the speed of said motor may be selectively controlled and maintained.

4. Apparatus in accordance with claim 3 wherein the output of said control signal generating means is D.C., said feedback signal generator means comprises a D.C. tachometer and said servo means includes modulator means for modulating the command signal and the feedback signal at a frequency identical to that of said source.

5. Apparatus in accordance with claim 3 wherein said feedback generator means comprises an A.C. tachometer.

6. Improved servo apparatus for providing position control of the output shaft of a motor comprising

11 a source of fixed amplitude A.C. energy,
cyclically operable switching means,
a motor connected in parallel with said source and in series with said switching means,
means connected to said source and coupled to said switching means for cyclically actuating said switching means in a fixed phase relationship to cyclic variation in said A.C. source,
control signal generating means having a selectively variable amplitude and phase command signal output,
feedback signal generator means connected and responsive to position variations of said motor's output shaft to generate signals indicative of the shaft's position, and
servo means connected at its input to said control signal generating means and said feedback signal generator means and at its output to said cyclical actuating means for varying said fixed phase relationship, whereby the position of said motor's output shaft is adjusted to the selected position.

7. Improved apparatus for converting fixed amplitude A.C. electrical energy into variable amplitude D.C. electrical energy comprising
a source of fixed amplitude A.C. energy,
at least one double throw contact pair means,
load means connected in parallel with said source and in series with said contact pair means,
cyclically operable means connected to said source and coupled to said contact pair means for alternately opening and closing a circuit through said contact pair means in phased relationship to cyclic variations in said source,
selectively operable control means for generating a command signal proportional to a desired amplitude of D.C. energy through said load, and
control means responsive to said command signal for varying the phase relationship of said cyclically operable means relative to said source to thereby vary the amplitude of the source energy applied to said load.

8. Improved apparatus for converting fixed amplitude A.C. electrical energy into veriable amplitude, variable polarity D.C. electrical energy comprising
a source of fixed amplitude A.C. energy,
at least one double throw contact pair means,
load means connected in parallel with said source and and in series with said contact pair means,
cyclically operable means connected to said source and coupled to said contact pair means for sequentially opening and closing said contact pair means in phased relationship to cyclic variations in said source,
selectively operable control means for generating a command signal representative of a selected amplitude and polarity of D.C. energy through said load,
means for generating feedback signals representative of the amplitude and polarity of D.C. energy passed through said load, and
servo control means responsive to said command signal and said feedback signals for varying the phase relationship of said cyclically operable means relative to said source to thereby correct for any variations from the selected amplitude and polarity D.C. energy through said load.

9. Improved apparatus for converting fixed amplitude electrical energy into variable amplitude, reversible phase A.C. electrical energy comprising
a source of fixed amplitude A.C. energy,
a source of fixed amplitude D.C. electrical energy,
a plurality of double throw contact pair means, the contacts of each pair being connected across said D.C. source,
armature means associated with each of said contact pairs and cyclically operable therebetween,
load means connected between said armature means,
cyclically operable means connected to said A.C. source and coupled to said armature means for cyclically actuating said armature means in phased relationship to cyclic variations in said A.C. source,
selectively operable control means for generating a command signal proportional to a desired phase and amplitude of A.C. energy through said load, and
control means responsive to said command signals for varying the phase relationship of said cyclically operable means relative to said A.C. source to thereby vary the amplitude and phase of the A.C. energy applied to said load.

10. Improved apparatus for controlling the speed of electric motors of the type operable from D.C. energy comprising
a source of fixed amplitude A.C. energy,
a plurality of double throw contact pair means, the contacts of each pair being connected in parallel with said source,
armature means associated with each of said contact pairs and cyclically operable therebetween,
motor means connected between said armature means,
cyclically operable means connected to said source and coupled to said armature means for cyclically actuating said armature means in phased relationship to cyclic variations in said source,
selectively operable control means for generating a command signal proportional to a selected speed of said motor means,
means for generating feedback signals representative of the speed of said motor, and
servo cotrol means responsive to said command signals and said feedback signals for varying the phase relationship of said cyclically operable means relative to said source to thereby correct for any variations from the selected motor speed.

11. Improved servo apparatus for providing position control of the output shaft of a motor comprising
a source of fixed amplitude A.C. energy,
a plurality of double throw contact pair means, the contacts of each pair being connected in parallel with said source,
armature means associated with each of said contact pairs and cyclically operable therebetween,
motor means connected between said armature means,
cyclically operable means connected to said source and coupled to said armature means for cyclically actuating said armature means in phased relationship to cyclic variations in said A.C. source,
control means for generating a command signal representative of a selected position of the output shaft of said motor,
means for generating feedback signals representative of said motor's output shaft position, and
servo control means responsive to said command signal and said feedback signals for varying the phase relationship of said cyclically operable means relative to said source to thereby correct for any variations from the selected position of said motor's output shaft.

12. Improved apparatus for controlling the speed of a motor comprising
a source of fixed amplitude A.C. energy,
a first and second double throw contact pair means, one contact of said first contact pair means and one contact of said second contact pair means being connected to opposite sides of said source, the second contact of said second contact pair means being connected to ground through a high impedance coupling,
armature means associated with each of said contact pairs and cyclically operable therebetween,
motor means connected between said armature means,
a first and a second cyclically operable means associated with said first and said second contact pair means respectively and connected to said source and coupled to said armature means for cyclically actuating said armature means in phased relationship to cyclic variations in said source, control means for generating a command signal proportional to a selected motor speed, feedback circuit means including capacitor means connected to the second contact of said first contact pair means, said capacitor being charged to a potential proportional to the speed of said motor by the counter-E.M.F. of said motor during alternate half cycles of said source, and servo means responsive to said command signal and the potential stored in said capacitor means for varying the phase relationship of said second cyclically operable means relative to said source to thereby correct for any variations from the selected motor speed.

13. Improved apparatus for controlling the speed of a motor comprising a source of fixed amplitude A.C. energy, at least one double throw contact pair means, armature means associated with each of said contact pair means and cyclically operable therebetween, motor means connected in series with said armature means and in parallel with said A.C. source, a plurality of cyclically operable means connected to said A.C. source and coupled to said armature means for cyclically actuating said armature means in phased relationship to cyclic variations in said A.C. source, control means for generating a command signal related to a selected speed of said motor, means for generating feedback signals related to said motor's speed, and sevro control means responsive to said command signal and said feedback signals for varying the phase relationship of at least one of said cyclically operable means relative to said source to thereby correct for any variations from the selected motor speed.

14. Improved apparatus for controlling the speed of a motor in accordance with claim 13 wherein said means for generating feedback signals related to said motor's speed comprises means for obtaining feedback signals derived from the counter-E.M.F. of the motor.

15. Apparatus for converting fixed amplitude polyphase A.C. energy into variable amplitude, variable polarity D.C. energy comprising a source of polyphase A.C. energy, a D.C. load, a plurality of double throw contact pair means associated with each phase of said polyphase source, armature means associated with each of said contact pairs and cyclically operable therebetween, cyclically operable means connected across each phase of said polyphase source and coupled to the armature means associated with the contact pair means for the same phase for cyclically actuating said armature means in phased relationship to cyclic variations in said phase, control means for generating a command signal proportional to a selected polarity and amplitude of D.C. energy through said load, servo control means connected to each said cyclical operating means and connected and responsive to said command signals for varying the phase relationship of each of said cyclical operating means relative to its associated phase, and means connecting said contact pair means, said armature means and said D.C. load in circuit with said polyphase source for applying rectified A.C. energy to said load, whereby the amplitude and polarity of the rectified A.C. energy is varied in accordance with said command signal.

References Cited by the Examiner

UNITED STATES PATENTS

| | | | |
|---|---|---|---|
| 2,530,749 | 11/1950 | Yardeny | 318—346 |
| 2,682,027 | 6/1954 | Willis | 318—520 |
| 2,703,862 | 3/1955 | Gordon | 318—329 X |
| 2,716,723 | 8/1955 | King | 318—329 X |
| 2,905,876 | 9/1959 | Hillman | 318—346 |
| 3,064,176 | 11/1962 | Walz et al. | 318—519 X |
| 3,231,801 | 1/1966 | Lang | 318—329 X |

ORIS L. RADER, *Primary Examiner.*

S. GORDON, J. C. BERENZWEIG,
*Assistant Examiners.*